Patented Nov. 26, 1946

2,411,676

UNITED STATES PATENT OFFICE 2,411,676

CORROSION INHIBITING COMPOSITION AND METHOD

Lloyd M. Burghart, Darien, Conn., assignor to U. S. Industrial Chemicals, Inc., New York, N. Y., a corporation of Delaware No Drawing. Application July 15, 1944, Serial No. 545,203

9 Claims. (Cl. 252—387)

1

This invention relates to corrosion inhibiting compositions and methods of inhibiting corrosion and particularly to products which can be stored and shipped in a dry condition and are substantially soluble in water and in aqueous solutions of alcohols including glycols and the like, customarily employed as "antifreeze" in the cooling systems of internal combustion engines.

The problem of retarding corrosion in such cooling systems has occupied the attention of many investigators, and numerous suggestions have been made concerning compositions suitable for the purpose. While some of the proposed ingredients are normally solid, the effective compositions heretofore have been liquids such as the solution described in Letters Patent No. 2,038,988 issued to me on April 28, 1936. The use of such liquids involves serious problems of storage and transportation which have been accentuated by prevailing conditions resulting from the war.

One of the most perplexing of the questions involved arises from the fact that the cooling systems of internal combustion engines as used for example in motor vehicles include surfaces of numerous different metals which are exposed to the action of the circulating liquid such as water, usually including dissolved salts as impurities, or aqueous solutions of such alcohols as methyl, ethyl and iso-propyl, and ethylene glycol or other polyhydric alcohols or mixtures thereof. The metals so exposed may include brass, copper, solder, aluminum, especially in the form of engine head alloys, "Bohnalite," steel and cast iron. All of these metals display different susceptibility to corrosion under varying conditions and in the presence of different corrosion inhibiting agents. An inhibitor in the case of one metal may have the reverse effect on another. Hence the difficulty of providing a composition which affords a reasonable degree of protection for all of the metals present and particularly one which can be prepared, stored and shipped in a dry form to be dissolved in the cooling liquid when required.

It is the object of the present invention to provide a dry inhibitor composition which can be dissolved in water or in aqueous solutions of any of the commonly used organic antifreeze liquids such as those heretofore mentioned to afford protection against corrosion for the metals exposed in the cooling system of an internal combustion engine.

Another object of the invention is the provision of a solid composition which can be added as a corrosion inhibitor to used cooling liquids, particularly aqueous solutions of ethylene glycol in which the corrosion inhibitor originally present in the fresh solution has become ineffective so that the solution may be reused with safety in the cooling system.

A further object of the invention is the provision of a satisfactory method of inhibiting corrosion in the cooling systems of internal combustion engines and a method of restoring solutions in which inhibiting agents originally contained therein have become ineffective.

Other objects and advantages of the invention will be apparent as it is better understood by reference to the following specification which describes the preferred embodiments of the invention.

To afford the advantages which are attained as a result of the present invention, it is necessary to provide a composition which meets certain requirements. The composition must consist of solid materials capable of being packed, stored and shipped in a dry condition. The ingredients must be substantially soluble in water and in aqueous solutions of alcohols including glycols and other polyhydric alcohols. The material must be stable chemically, that is to say, the ingredients must not react with each other either during storage or in use and thereby destroy the effectiveness of the composition. The materials used must lend themselves readily to proper grinding and mixing, must not segregate when mixed, and they must not be unduly hygroscopic. They must afford corrosion inhibiting effect over a relatively extended period, i. e., at least that of the average winter season, and must provide protection for solder, aluminum, brass and copper, as well as iron and steel. They must afford a liberal supply of reserve alkalinity to ensure a reasonable period of effectiveness, and finally they must have no deleterious effect upon rubber connections and gaskets and present no serious problems of foaming.

No single solid chemical is known which possesses all of the desirable features mentioned, and there is no reasonable probability that any such chemical exists or will be available. Hence the problem consists in correlating the properties of a number of chemical agents which, in combination, will provide corrosion inhibiting protection for the various metals present in the cooling system and at the same time have the other advantages hereinbefore specified.

I have discovered that such compositions may be prepared from certain well known chemical agents and that when such agents are combined, in substantially the proportions hereinafter set forth, they will jointly and effectively protect the various metals present in the cooling system from corrosion. Furthermore, the materials specified are all solids, are all sufficiently soluble in water and alcoholic solutions such as those mentioned, and together they have the other desirable properties which I have described.

The compositions may vary somewhat with respect to the ingredients employed as well as the proportions thereof which I utilize. As a basis of such compositions, I prefer to employ alkali metal borates such as borax although boric acid may be substituted for a portion of the borax in an amount sufficient to adjust the pH of the solution of the composition within the limits hereinafter disclosed.

The borates may be formed in situ by adding an alkali metal compound such as the hydroxide or carbonate to boric acid. With this material, I combine an alkali metal chromate, either the neutral chromate or the acid chromate such as potassium chromate or potassium dichromate. As an additional ingredient, I find it desirable to use an alkali metal orthosilicate such as sodium orthosilicate or an alkali metal or aluminum alkali metal double salt of fluosilicic acid such as sodium silico-fluoride or aluminum sodium silico-fluoride. Either of these materials or both orthosilicates and silico-fluorides may be included in the composition. Additional protection may be obtained by adding to the composition an alkali metal nitrite such as sodium nitrite, but the nitrite is not essential and may be omitted. In commercial compositions, a small amount of fluorescein is included merely as a coloring agent.

In the preparation of compositions such as those described, the proportions may be varied within fairly wide limits. An essential consideration is, however, that in respect to acid ingredients such as silico-fluorides, boric acid and alkali metal dichromates, the proportion should be such with respect to the alkalinity of the other ingredients that the pH of a solution of the entire composition is not less than 7.5. This is particularly true if nitrites are present in the composition, since a lower pH is likely to cause decomposition of nitrites. In general, either sodium or potassium compounds may be used interchangeably. The selection of ingredients with respect to alkali metal compounds depends primarily upon availability and other economic considerations.

As examples of suitable compositions, the following table affords desirable relative proportions of the various ingredients which may be combined to afford satisfactory inhibiting compositions which dissolve sufficiently in water and in aqueous solutions of alcohols including glycols:

Table I

|  | I | II | III | IV | V |
|---|---|---|---|---|---|
| Alkali metal borate (calcined) | 70.75 | 61.80 | 62.20 | 72.95 | 69.10 |
| Potassium chromate, neutral, or potassium dichromate | 20.10 | 17.50 | 17.65 | 17.00 | 17.00 |
| Sodium orthosilicate | 9.10 | 7.95 |  | 5.00 | 6.00 |
| Sodium silico-fluoride or aluminum sodium silico-fluoride |  |  | 7.30 | 5.00 | 5.00 |
| Sodium nitrite |  | 12.70 | 12.80 |  | 12.85 |
| Fluorescein | .05 | .05 | .05 | .05 | .05 |
|  | 100.00 | 100.00 | 100.00 | 100.00 | 100.00 |

As indicative of the available range of proportions to produce effective compositions, the following table indicates the general limits, it being understood that the orthosilicates and silico-fluorides may be used interchangeably or combined and that the nitrite may or may not be included in the composition.

Table II

|  | Per cent |
|---|---|
| Alkali metal borate (calcined) | 40–75 |
| Alkali metal chromate (neutral) or dichromate | 10–35 |
| Alkali metal orthosilicate | 5–10 |
| Alkali metal or aluminum alkali metal silico-fluoride | 5–10 |
| Alkali metal nitrite | 5–14 |

Compositions such as those described have been subjected to extended tests under corrosion conditions comparable to those present in the cooling systems of internal combustion engines employing water and aqueous alcoholic solutions. For the purpose of inhibiting corrosion, I have found it desirable to use approximately 0.625 ounce per gallon of liquid capacity of the cooling system. More or less could be used. The amount indicated approximates ideal anti-corrosion effect in respect to all of the metals normally present in an engine cooling system, such effect being the result of the combined action of all of the ingredients used in respect to all of the metals present.

Various changes may be made in the ingredients and the proportions thereof as described without departing from the invention or sacrificing the advantages thereof.

I claim:

1. A dry composition capable of imparting corrosion inhibiting characteristics to water and aqueous solutions of alcohols in the cooling systems of internal combustion engines consisting essentially of the following ingredients in the weight percentage proportions of an alkali metal borate about 40% to about 75%, a compound of the group consisting of alkali metal chromates and dichromates about 10% to about 35%, and a compound of the group consisting of alkali metal orthosilicates, alkali metal silico-fluorides and aluminum alkali metal silico-fluorides about 5% to about 10%.

2. A dry composition capable of imparting corrosion inhibiting characteristics to water and aqueous solutions of alcohols in the cooling systems of internal combustion engines comprising essentially the following ingredients in the weight percentage proportions of an alkali metal borate about 40% to about 75%, a compound of the group consisting of alkali metal chromates and dichromates about 10% to about 35%, a compound of the group consisting of alkali metal orthosilicates, alkali metal silico-fluorides and aluminum alkali metal silico-fluorides about 5% to about 10%, and an alkali metal nitrite about 5% to about 14%, the amounts of said ingredients being selected within the stated ranges so as to total approximately 100%.

3. A dry composition capable of imparting corrosion inhibiting characteristics to water and aqueous solutions of alcohols in the cooling systems of internal combustion engines consisting essentially of the following ingredients in the weight percentage proportions of sodium borate about 40% to about 75%, sodium chromate about 10% to about 35%, and a compound of the group consisting of alkali metal orthosilicates, alkali metal silico-fluorides and aluminum alkali metal silico-fluorides about 5% to about 10%.

4. A dry composition capable of imparting corrosion inhibiting characteristics to water and aqueous solutions of alcohols in the cooling systems of internal combustion engines consisting essentially of the following ingredients in the weight percentage proportions of sodium borate about 40% to about 75%, sodium chromate about 10% to about 35%, and sodium orthosilicate about 5% to about 10%.

5. A dry composition capable of imparting corrosion inhibiting characteristics to water and aqueous solutions of alcohols in the cooling systems of internal combustion engines comprising essentially the following ingredients in the weight percentage proportions of sodium borate about 40% to about 75%, sodium chromate about 10% to about 35%, sodium orthosilicate about 5% to about 10%, and sodium nitrite about 5% to about 14%, the amounts of said ingredients being selected within the stated ranges so as to total approximately 100%.

6. The method of inhibiting corrosion in the cooling system of internal combustion engines which consists of circulating therein water and aqueous solutions of alcohols containing in solution a composition consisting essentially of the following ingredients in the weight percentage proportions of an alkali metal borate about 40% to about 75%, a compound of the group consisting of alkali metal chromates and dichromates about 10% to about 35%, and a compound of the group consisting of alkali metal orthosilicates, alkali metal silico-fluorides and aluminum alkali metal silico-fluorides about 5% to about 10%.

7. The method of inhibiting corrosion in the cooling system of internal combustion engines which consists of circulating therein water and aqueous solutions of alcohols containing in solution a composition comprising essentially the following ingredients in the weight percentage proportions of an alkali metal borate about 40% to about 75%, a compound of the group consisting of alkali metal chromates and dichromates about 10% to about 35%, a compound of the group consisting of alkali metal orthosilicates, alkali metal silico-fluorides and aluminum alkali metal silico-fluorides about 5% to about 10%, and an alkali metal nitrite about 5% to about 14%, the amounts of said ingredients being selected within the stated ranges so as to total approximately 100%.

8. The method of restoring the corrosion inhibiting properties of spent aqueous alcoholic solutions employed as anti-freeze in the cooling system of internal combustion engines which consists of adding to such spent solutions a composition consisting essentially of the following ingredients in the weight percentage proportions of an alkali metal borate about 40% to about 75%, a compound of the group consisting of alkali metal chromates and dichromates about 10% to about 35%, and a compound of the group consisting of alkali metal orthosilicates, alkali metal silico-fluorides and aluminum alkali metal silico-fluorides about 5% to about 10%.

9. The method of restoring the corrosion inhibiting properties of spent aqueous alcoholic solutions employed as anti-freeze in the cooling system of internal combustion engines which consists of adding to such spent solutions a composition comprising essentially the following ingredients in the weight percentage proportions of an alkali borate about 40% to about 75%, a compound of the group consisting of alkali metal chromates and dichromates about 10% to about 35%, a compound of the group consisting of alkali metal orthosilicates, alkali metal silico-fluorides and aluminum alkali metal silico-fluorides about 5% to about 10%, and an alkali metal nitrite about 5% to about 14%, the amounts of said ingredients being selected within the stated ranges so as to total approximately 100%.

LLOYD M. BURGHART.